(12) United States Patent
Vash et al.

(10) Patent No.: US 10,127,153 B1
(45) Date of Patent: Nov. 13, 2018

(54) CACHE DEPENDENCY HANDLING

(71) Applicant: Apple Inc., Cupertino, CA (US)

(72) Inventors: James Vash, San Ramon, CA (US);
Prashant Jain, San Jose, CA (US);
Sandeep Gupta, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 14/868,245

(22) Filed: Sep. 28, 2015

(51) Int. Cl.
  *G06F 12/084* (2016.01)
  *G06F 12/0815* (2016.01)
  *G06F 9/38* (2018.01)

(52) U.S. Cl.
  CPC .......... *G06F 12/084* (2013.01); *G06F 9/3836* (2013.01); *G06F 12/0815* (2013.01); *G06F 2212/621* (2013.01)

(58) Field of Classification Search
  CPC .................................................. G06F 12/084
  USPC ......................................................... 711/130
  See application file for complete search history.

(56) References Cited

U.S. PATENT DOCUMENTS

| | | | | |
|---|---|---|---|---|
| 6,408,345 B1* | 6/2002 | Fuoco | ................. | G06F 12/0851 710/100 |
| 8,533,436 B2 | 9/2013 | Fryman et al. | | |
| 9,086,973 B2 | 7/2015 | Vorbach | | |
| 2008/0140934 A1 | 6/2008 | Luick | | |
| 2011/0055531 A1* | 3/2011 | Bellows | ................. | G06F 9/522 712/245 |
| 2012/0198178 A1* | 8/2012 | Cox | ....................... | G06F 12/084 711/145 |
| 2013/0254488 A1 | 9/2013 | Kaxiras et al. | | |
| 2014/0006716 A1* | 1/2014 | Steeley, Jr. | ............ | G06F 15/167 711/130 |
| 2014/0052918 A1* | 2/2014 | Khailany | ............ | G06F 12/0859 711/122 |
| 2014/0317357 A1* | 10/2014 | Kaplan | ................ | G06F 12/0862 711/137 |
| 2016/0092238 A1* | 3/2016 | Codrescu | ............ | G06F 9/30036 712/200 |
| 2016/0196633 A1* | 7/2016 | Charles | .................. | G06F 12/128 345/501 |

FOREIGN PATENT DOCUMENTS

WO  2013186694  12/2013

* cited by examiner

*Primary Examiner* — Gautam Sain
(74) *Attorney, Agent, or Firm* — Meyertons, Hood, Kivlin, Kowert & Goetzel, P.C.

(57) ABSTRACT

Techniques are disclosed relating to managing data-request dependencies for a cache. In one embodiment, an integrated circuit is disclosed that includes a plurality of requesting agents and a cache. The cache is configured to receive read and write requests from the plurality of requesting agents including a first request and a second request. The cache is configured to detect that the first and second requests specify addresses that correspond to different portions of the same cache line, and to determine whether to delay processing one of the first and second requests based on whether the first and second requests are from the same requesting agent. In some embodiments, the cache is configured to service the first and second requests in parallel in response to determining that the first and second requests are from the same requesting agent.

18 Claims, 5 Drawing Sheets

CACHE DEPENDENCY HANDLING

BACKGROUND

Technical Field

This disclosure relates generally to processors, and, more specifically, to managing dependencies within processor caches.

Description of the Related Art

Modern high-performance processors often use out-of-order execution (OoOE) to achieve higher levels of instruction throughput. Under this paradigm, instructions may be executed in a different order than program order (i.e., the order in which instructions are arranged within a program). In many instances, instructions may also be executed in parallel. A processor supporting OoOE, however, still needs to ensure that the output of any instructions executed out of order is the same as if those instructions had been executed in order.

In order to achieve this objective, a processor supporting OoOE typically analyzes a sequence of instructions to identify instruction dependencies that may create problems if the instructions associated with those dependencies are executed out of order. For example, a program may include a write instruction that specifies a write operation to a particular memory address and a subsequent, read instruction that specifies a read operation from the memory address—commonly referred to as a "read-after-write hazard." Accordingly, when the instructions are executed in order, the read instruction receives the data written by the write instruction. If these instructions are executed out of order, however, the write occurs after the read, and the read instruction receives the wrong data (e.g., whatever was written by an earlier executed write instruction). For this reason, a processor may not permit instructions that have problematic dependencies to be executed out of order.

SUMMARY

The present disclosure describes embodiments in which a multi-core processor shares a cache among multiple processor cores and/or one or more other requesting agents. In various embodiments, the cache is configured to receive read and write requests from the requesting agents and to service requests out of order if the requests do not have dependencies on other requests that would potentially result in the wrong data being returned (e.g., a request that writes to an address that is later read by another request). In various embodiments, the cache is configured such that a given requesting agent can send a request to access merely a portion of a given cache line. In such an embodiment, the cache is configured to detect requests that specify addresses that correspond to different portions of the same cache line. If the requests are determined to be from the same requesting agent, the cache is configured to service the requests out of order—e.g., in parallel in some embodiments. If the requests, however, are from different requesting agents, the cache is configured to service the requests in order by delaying processing the later request. In some instances, processing requests in this manner may allow a greater number of requests to be processed within a given window.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "cache configured to receive data requests from a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processor cores, the terms "first" and "second" processor cores can be used to refer to any two of the eight processor cores. In other words, the "first" and "second" processor cores are not limited to logical processor cores 0 and 1, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A cache may similarly track dependencies of data requests in order to service requests in a different order than the order in which they were received. As used herein, the term "dependency" refers to a relationship between two or more data requests that specify addresses associated with the same cache line in a cache. Accordingly, a later data request is described herein as being "dependent" on an earlier data request if they both specify addresses associated with the same cache. For example, a cache may receive a first request to write data associated with a particular address and then receive a second, dependent request to read data associated with the particular address. If a cache were to service these requests out of order, the wrong data would be returned when the read request is serviced. Tracking data request dependencies can be difficult in a multi-core processor—particularly when a multi-level cache hierarchy is used. This problem may be further compounded when differing cache line sizes are used by caches located at different levels in the cache hierarchy.

As will be described below in various embodiments, a processor is disclosed that includes requesting agents that share a cache. As used herein, the term "requesting agent" and "agent circuit" refer generally to any circuit configured to access a cache. Examples of requesting agents may include processing cores in a multi-core processor, a fabric controller, a graphics unit, an I/O bridge, north- or south-bridge controllers, etc. Accordingly, while various embodiments described below may be presented within the context of processor cores accessing a cache, this description is not intended to be limiting, but rather to provide examples of requesting agents accessing a cache.

In various embodiments discussed below, the requesting agents are configured to request portions of cache lines within the cache. For example, in one embodiment, the cache has a 128-byte cache line, but a requesting agent is configured to request a 64-byte portion of the line—i.e., the upper or lower 64-byte half of the line. Accordingly, as used herein, the phrase "portion of a cache line" refers to an amount of a cache line that is less than the entirety of the cache line. In some embodiments, the cache may be configured to track request dependencies on a cache-line basis. For example, the cache may identify two data requests as having a dependency even though they request different portions of a particular cache line. In various embodiments, however, the cache is configured to make an exception for requests that attempt to access different portions but are from the same core. More specifically, in such an embodiment, the cache is configured to detect whether requests specify addresses that correspond to different portions of the same cache line. If the cache detects requests having this type of dependency, the cache is configured to determine whether to delay processing the requests based on whether the requests are from the same requesting agent. If the requests are from the same agent, the cache may proceed to service the requests in parallel. As used herein, the term "parallel" refers to two or more requests being processed such that their processing overlaps for at least some period. For example, the cache may perform a single retrieval of a cache line and then route the requested portions to the requesting agent in order to service the requests in a parallel.

In some embodiments, if the requests are determined to be from different agents, the cache is configured to service the requests in the order in which they are received by delaying the later received request until the earlier request has been serviced by the cache. In some embodiments, the cache delays servicing requests, even though they pertain to different portions of a cache line, because the cache may not be able to route portions of the same cache line to different cores at the same time and/or approximately manage cache coherency among the cores. In other embodiments, however, the cache is configured such that it is capable of processing requests for different portions in parallel regardless of whether they are from the same or different requesting agents.

In various embodiments, servicing cache requests in parallel allows the cache to achieve greater data request throughput—i.e., process more data requests within a given period. Furthermore, processor cores often have an access pattern that includes issuing data requests for adjacent addresses, which may result in multiple portions of the same cache lines being accessed. Thus, a processor core may frequently be able to obtain the benefit of servicing data requests in parallel.

Figure 1:
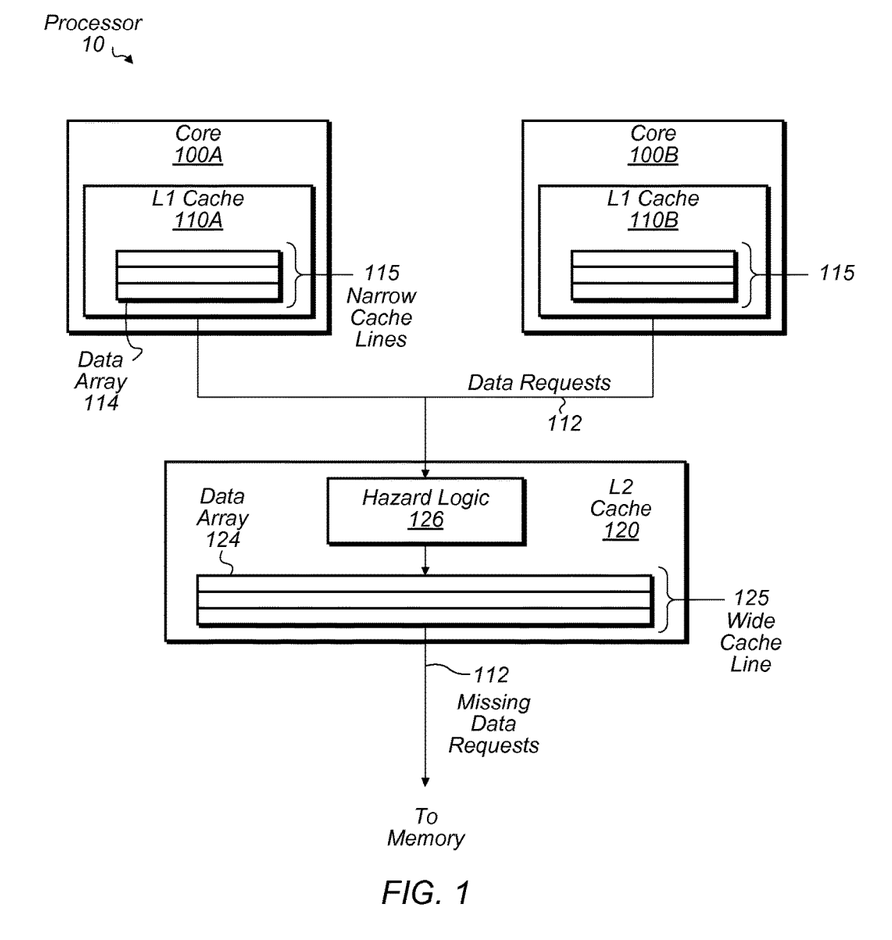
FIG. 1 is a block diagram illustrating one embodiment of a processor having multiple caches.

Turning now to FIG. 1, a block diagram of one embodiment of a processor 10 is depicted. In the illustrated embodiment, processor 10 includes multiple processor cores 100A and 100B that include level 1 (L1) caches 110A and 110B respectively. In this embodiment, processor 10 also includes a level 2 (L2) cache 120, which includes a data array 124 and hazard logic 126. In various embodiments, processor 10 may be configured differently than shown. Accordingly, in some embodiments, processor 10 may include additional circuitry such as additional processor cores 100, additional caches, additional requesting agents other than processor cores 100, etc. In some embodiments, processor 10 may be included within a computing device that includes additional hardware such as described below with respect to FIG. 5.

Cores 100, in general, are processor cores configured to execution instructions. Cores 100 may include multiple execution pipelines configured to execute multiple instructions simultaneously. In some embodiments, cores 100 support out-of-order execution (OoOE). Cores 100 may also support speculative execution and/or scouting execution. In various embodiments, cores 100 are configured to issue data requests 112 to caches 110 and 120 in order to read data or write data. In some instances, these requests 112 may be issued in response to executing load and store instructions. Requests may also be issued to read instructions from memory—e.g., by instruction fetch units in cores 100.

Caches 110, in one embodiment, are L1 caches configured to store data in a data array 114 for a respective core 100 and/or other requesting agents. In other embodiments, caches 110 may implement other levels of a cache hierarchy. In some embodiments, caches 110 (and cache 120) are set-associative caches; however, caches 110 (and caches 120) may implement other suitable storage schemes in other embodiments. In various embodiments, caches 110 have a smaller size than the size of cache 120—e.g., 1 MB vs. 3 MB in one embodiment. In various embodiments, caches 110 also have smaller cache lines (shown as narrow cache lines 115) than cache 120's cache lines (shown as wide cache lines 125). For example, in one embodiment, cache lines 115 are 64-byte lines, and cache lines 125 are 128-byte lines.

Cache 120, in one embodiment, is an L2 cache that is shared between cores 100 and is configured to store data in data array 124. Accordingly, in various embodiments, cache 120 is configured to receive data requests 112 from caches 110 (and more generally cores 100) in response to those requests missing in caches 110—i.e., caches 110 not storing the requested data. When cache 120 receives a request 112, cache 120 may determine whether the requested data is present in the cache 120 (i.e., the request 112 hits in the cache). If the requested data is present, cache 120 may service the request 112 by providing the data to requesting cache 110. If, however, the requested data is not present, cache 120 may convey the missing request 112 to another memory (e.g., random access memory (RAM) in some embodiments or a higher-level cache in other embodiments). In some embodiments, cache 120 may also be configured to receive snooping requests (not shown) from caches 110 in order to implement a cache coherency across caches 110 and 120.

As noted above, in various embodiments, cache 120 is configured to receive requests 112 for data in portions of a cache line 125. That is, a given data request 112 may specify an address that maps to a corresponding portion of a cache line 125. For example, in one embodiment, a data request 112 may specify an address that corresponds to the lower or upper 64-byte portion of a particular 128-byte cache line of data array 124. In some embodiments, the size of requested portions corresponds to the cache-line size of narrow cache lines 115.

In various embodiments, cache 120 is configured to analyze received data requests 112 to determine whet it can service data requests 112 out of order—i.e., in a different order in which requests 112 were received from cores 100. In order to prevent the incorrect data from being delivered when requests 112 are serviced in this manner, in one embodiment, cache 120 includes hazard logic 126 configured to identify "hazards" that could potentially result in the wrong data being provided for a request 112. More specifically, in one embodiment, hazard logic 126 is circuitry configured to detect whether dependencies exist between requests 112 and prevent requests 112 that have one or more dependencies from being serviced out of order, by delaying servicing requests 112. Accordingly, logic 126 may be configured to identify read-after-write hazards (i.e., the situation in which a read request specifies the same address as an earlier write request) and write-after-write hazards (i.e., the situation in which a write request specifies the same address as an earlier write request). In some embodiments, hazard logic 126 may also track read-after-read hazards (i.e., the situation in which two read requests specify the same address) although this type of hazard may be less of a concern.

As noted above, in various embodiments, hazard logic 126 is configured to track dependencies on a cache-line basis (as opposed to on an address basis). That is, hazard logic 126 may identify two requests 112 as having a dependency if they specify different addresses that correspond to different portions of the same cache line 125. In such an embodiment, however, hazard logic 126 is configured to make an exception for requests 112 that are identified as having a dependency, but are from the same requesting agent (e.g., the same core 100) and specify addresses corresponding to different portions of the same cache line 125. Accordingly, when hazard logic 126 detects requests 112 that meet these criteria, hazard logic 126 is configured to allow the requests 112 to be serviced out of order. In some instances, this may include hazard logic 126 causing data array 124 to service the requests in parallel—assuming that each of the requests 112 hits in cache 120. In other instances, hazard logic 126 may merely cause data array 124 to service the later received request before the earlier received request. On the other hand, if two requests 112 are from different cores 100 (or specify the same address), in some embodiments, hazard logic 126 is configured to delay servicing the later request 112 in order for the requests 112 to be processed in order. In other embodiments, however, hazard logic 126 may be configured to allow requests 112 to be processed in parallel regardless of whether the requests are from the same or different requesting agents.

As will be described with respect to FIG. 2, in some embodiments, cache 120 is configured to store received data requests 112 in a buffer along with indications of the cores 100 that submitted the requests 112. In such an embodiment, hazard logic 126 is configured to determine whether requests 112 are from the same core 100 by analyzing the stored indications. In some embodiments, this buffer may also include additional metadata, which may be analyzed by hazard logic 126 as discussed below.

Figure 2:
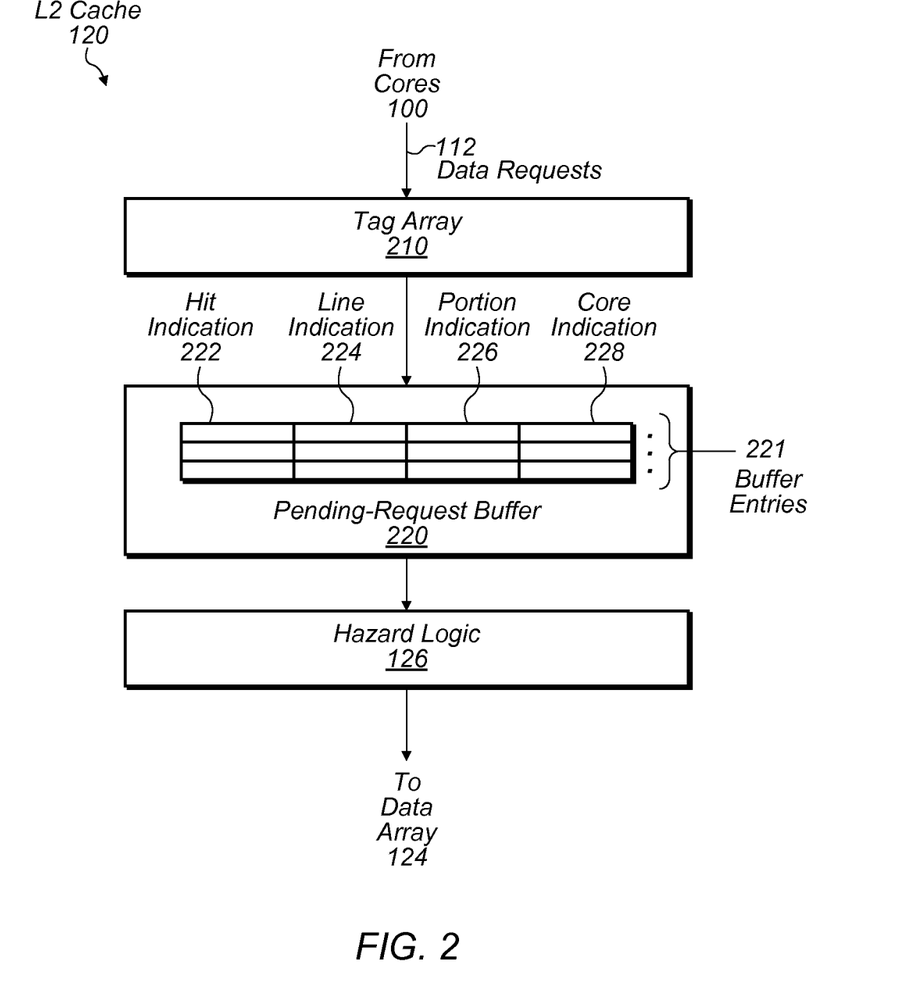
FIG. 2 is a block diagram illustrating one embodiment of at least a portion of a cache within the processor.

Turning now to FIG. 2, a block diagram illustrating one embodiment of a portion of cache 120 is presented. In the illustrated embodiment, cache 120 includes a tag array 210, pending-request buffer 220, and hazard logic 126. Although not depicted, cache 120 may also include data array 124 as noted above. In some embodiments, cache 120 may also be configured differently than shown.

Tag array 210, in one embodiment, is circuitry configured to determine whether a data request 112 hits in cache 120. In various embodiments, tag array 210 is configured to perform a comparison of an address tag specified in a received data request 112 with stored address tags corresponding to the data in cache 120. In such an embodiment, if tag array 210 identifies a match, tag array 210 is configured to determine that the request 112 hits in cache 120. If, however, no match is identified, tag array 210 is configured to determine that the request 112 misses in cache 120. In the illustrated embodiment, tag array 210 is configured to analyze received data requests 112 before the requests 112 are stored in pending-request buffer 220 in order for tag array 210 to generate a hit indication 222 for each request 112 discussed below.

Pending request buffer 220, in one embodiment, is configured to store pending requests 112 for cache 120 (i.e., requests that have not been serviced yet by cache 120). Cache 120 may also use information in buffer 220 to handle servicing a cache miss for a request 112. In various embodiments, buffer 220 is also configured to store additional metadata associated with requests 112 that is usable by hazard logic 126 to determine whether to provide the requests 112 to data array 124 for servicing. In the illustrated embodiment, buffer 220 includes multiple entries 221, each configured to store a hit indication 222 identifying whether a request 112 hits or misses in cache 120, a line indication 224 identifying the cache line 125 to be accessed by the request 112, a portion indication 226 identifying the portion of the cache line 125, and a core indication 228 identifying the core 100 that submitted the request 112. (In some embodiments, indications 224 and 226 may be determined from bits in the address specified by a request 112.) In some embodiments, buffer 220 may include additional information (or less information) as discussed below with respect to FIG. 3.

As noted above, in various embodiments, hazard logic 126 is configured to analyze entries 221 in buffer 220 in order to determine whether the pending requests 112 associated with those entries 221 have dependencies that warrant delaying the requests 112. In one embodiment, hazard logic 126 is configured to identify requests 112 that have dependencies by comparing line indications 224 to determine whether those requests 112 are attempting to access the same cache line 125. If two or more requests 112 are identified as having a dependency, logic 126 may then compare their portion indications 226 to determine whether they are accessing the same cache-line portion, and determine whether they are from the same core 100 (e.g., by comparing their core indications 228). If the request 112 are attempting to access different portions and are from the same core 100, hazard logic 126 may confirm that the requests 112 hit in cache 120 by examining their hit indications 222 and provide the requests 112 to data array 124 for servicing. If the requests 112 are from different cores 100 or are attempting to access the same cache line portion, hazard logic 126 may issue the earlier request 112 to data array 124 (as long as the request 112 hits in cache 120) and delay the servicing of the later request until the earlier request 112 has been serviced by data array 124. Accordingly, once the earlier request 112 has been serviced, hazard logic 126 may issue the later request 112 to data array 124 assuming the later request 112 hits in cache 120.

In various embodiments, hazard logic 126 is configured to lock a cache line once logic 126 issues one or more requests 112 to be serviced from the cache line. In various embodiments, locking the cache line prevents it from being victimized (i.e., being evicted from cache 120) or being invalidated while it is being used to service the requests 112. Locking the cache line may also prevent subsequent requests 112 (e.g., from another core 100) from accessing the cache line while the earlier issued requests 112 are being processed. In one embodiment, hazard logic 126 is configured to lock a cache line by set an indication that the cache line is in use. In such embodiment, hazard logic 126 is configured to not issue another request 112 that would access the cache line while this indication is set. In one embodiment, data array 124 is configured to clear this indication once array 124 has serviced the issued one or more requests 112 for the cache line.

Figure 3:
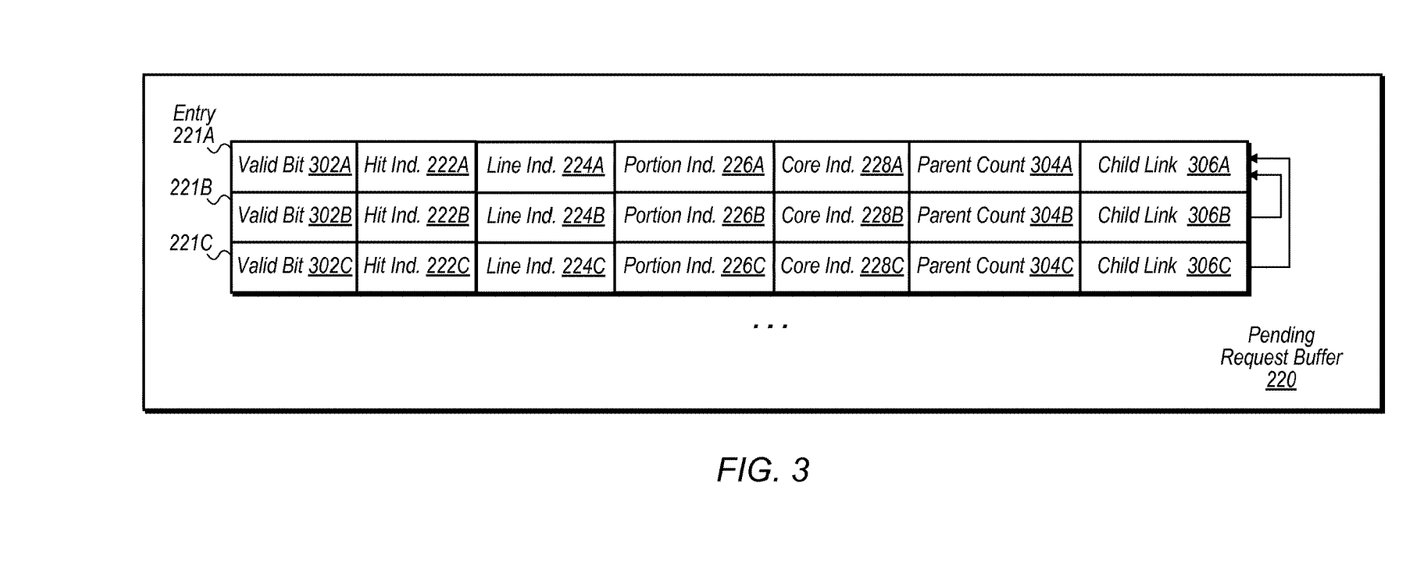
FIG. 3 is a block diagram illustrating one embodiment of a pending request buffer in the cache.

Turning now to FIG. 3, a block diagram of one embodiment of pending request buffer 220. As noted above, pending request buffer 220 may include various metadata in addition to elements 222-228 that is usable by hazard logic 126 to determine whether to delay servicing requests 112. In the illustrated embodiment, each entry 221 further includes a valid bit 302, parent count 304, and child link/pointer 306. In some embodiments, entries 221 may include more (or less) elements than shown. For example, in some embodiments, an entry 221 may also include an indication of the cache bank associated with a given request 112, an indication of the type of request 112 (e.g., whether the request is a write request or a read request), etc.

Valid bit 302, in one embodiment, indicates whether a particular entry 221 is valid. Accordingly, the valid bit 302 for a given entry 221 may be set upon storing a newly received request 112. The valid bit 303 may later be cleared after the request 112 has been serviced. In some embodiments, hazard logic 126 is configured to exclude entries 221 from its analysis if the valid bits 302 indicate that entries 221 are invalid.

Parent count 304, in one embodiment, indicates the number of parent requests 112 on which a given child request 112 depends. (The term "parent" refers to an earlier request on which a later "child" request depends.) In some instances, a child request 112 may have multiple parent requests 112. For example, a first request 112 from core 100A may be dependent on a second request 112 and a third request 112 from core 100B that are attempting to access different portions of a particular cache line 125. In one embodiment, in response to detecting a dependency, hazard logic 126 is configured to increment the parent count 304 of the child request 112. Continuing with the earlier example, the parent count 304 for the first request may be incremented twice—i.e., once for the dependency on the second request and once for the dependency on the third request. In some embodiments, hazard logic 126 is configured to delay servicing a request 112 until the parent count 304 for that request 112 indicates that the request 112 does not have any pending parent requests 112 (i.e., is not dependent on any pending request 112).

Child link 306, in one embodiment, identifies a child request 112 for a given parent request 112. For example, in FIG. 3, the request 112 corresponding to entry 221C may be a parent request of the request 112 corresponding to entry 221A. As shown in FIG. 3, the child link 306C for entry 221C may be set to identify the request corresponding to entry 221A as the child request. As also shown, the request 112 in entry 221B may also be a parent request of the request 112 in entry 221A, and thus child link 306B may also point to the request 112 in entry 221A. In various embodiments, hazard logic 126 may set child links 306 in response to identifying that dependencies exist between requests 112. In such an embodiment, hazard logic 126 may use child links 306 to determine whether a parent count 304 warrants adjustment when a request 112 is serviced. For example, once the request 112 in entry 221C is serviced, hazard logic 126 may examine child link 306C and determine that the request 112 in entry 221A is a child request. Hazard logic 126 may then decrement parent count 304A. Similarly, once the request 112 in entry 221B is serviced, hazard logic 126 may adjust parent count 304A in response to child link 306B identifying the request in entry 221A as a child request. Again, once parent count 304A indicates that the request 112 in entry 221A has no pending parent requests, hazard logic 126 may provide the request 112 to data array 124 for servicing if hit indication 222A indicates that the request hits in cache 120.

Figure 4:
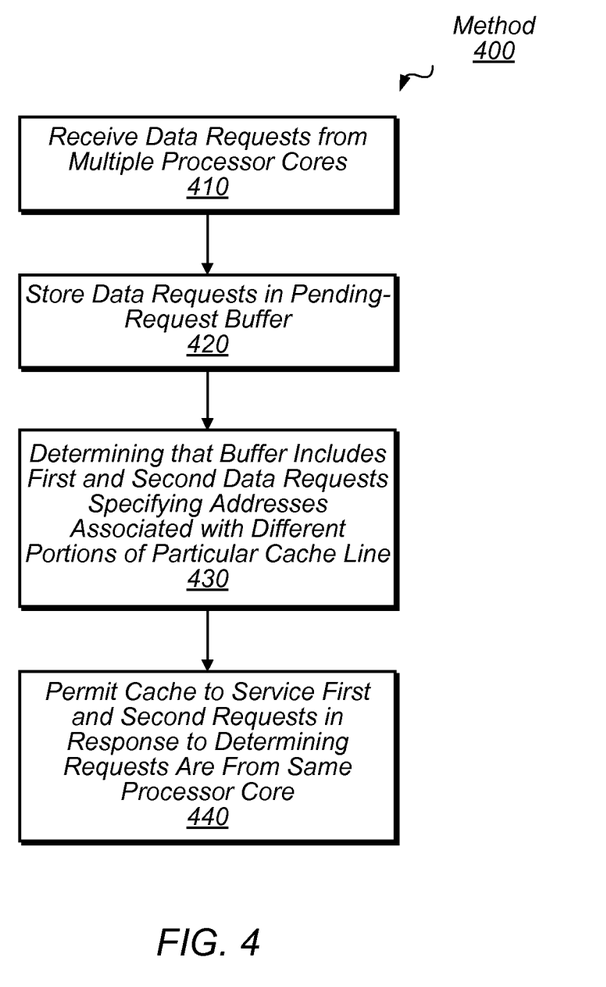
FIG. 4 is a flow diagram illustrating one embodiment of a method for processing data requests.

Turning now to FIG. 4, a flow diagram of a method 400 for processing data requests is depicted. Method 400 is one embodiment of a method that may be performed by a multi-core processor including a cache such as processor 10. In various embodiments, performance of method 400 may allow a cache to process more data requests within a given window—particularly if those requests are being sent by the same cores.

In step 410, data requests (e.g., data requests 112) from a plurality of processor cores (e.g., cores 100) are received. In some embodiments, these requests may include read requests to read data from the cache and write requests to write data to the cache.

In step 420, the data requests are stored in a buffer (e.g., pending-request buffer 220) configured to store pending data requests for the cache. In some embodiments, step 420 also includes storing indications (e.g., core indications 228) in the buffer that identify the different processor cores that issued the data requests. In some embodiments, other forms of information may also be stored with the data requests such as discussed above with respect to FIG. 3.

In step 430, a determination is made that the buffer includes a first data request and a second data request that specify addresses associated with different portions of a particular cache line in the cache (e.g., based on line indications 224 and portion indications 226). In some embodiments, step 430 may further include determining whether the first and second requests are from the same one of the plurality of processor cores (e.g., based on core indications 228). In some embodiments, step 430 may also include determining that the buffer includes a third data request that specifies an addressed specified by the first request and storing, in the buffer, a count value (e.g., parent count value 304) that identifies the third data request as being dependent on at least one other data request.

In step 440, the cache is permitted to service the first and second requests in response to determining that the first and second requests are from the same one of the plurality of processor cores. In some embodiments, step 440 includes the cache servicing the first and second requests in a different order than an order in which the first and second requests are received from the processor core—e.g., the requests may be serviced in parallel. In various embodiments, step 440 may also include preventing the cache from servicing one of a third data request and a fourth data request in response to determining that the third and fourth data requests are from different ones of the plurality of processor cores.

Exemplary Computer System

Figure 5:
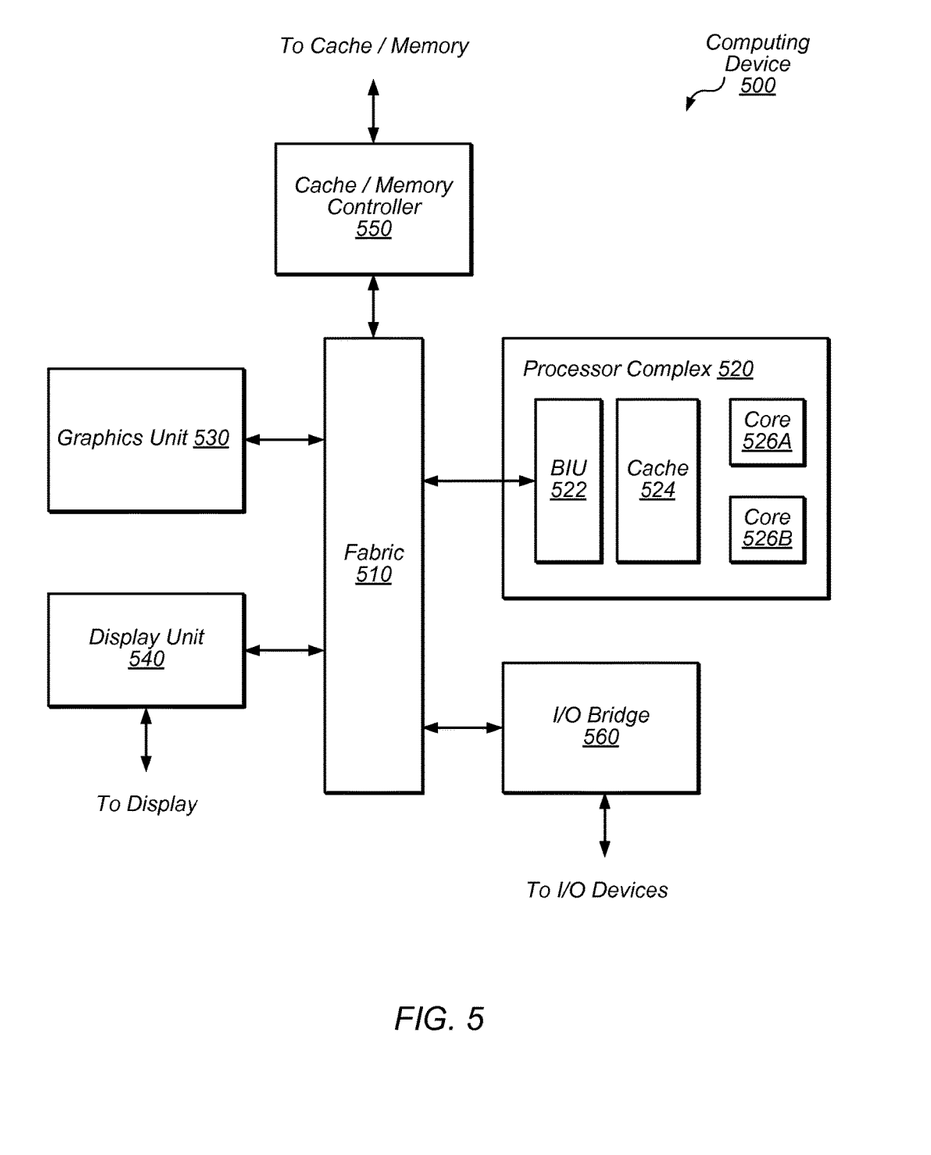
FIG. 5 is a block diagram illustrating one embodiment of an exemplary computer system.

Turning now to FIG. 5, a block diagram illustrating an exemplary embodiment of a device 500 is shown. Device 500 is one embodiment of a device that may include processor 10. In some embodiments, elements of device 500 may be included within a system on a chip (SOC). In some embodiments, device 500 may be included in a mobile device, which may be battery-powered. Therefore, power consumption by device 500 may be an important design consideration. In the illustrated embodiment, device 500 includes fabric 510, processor complex 520, graphics unit 530, display unit 540, cache/memory controller 550, input/output (I/O) bridge 560.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. (In some embodiment, processors complex 520 implement functionality of processor 10 described above with respect to FIG. 1.) In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA) which may include operating system instructions and user application instructions.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc.

I/O bridge 560 may include various elements configured to implement: universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
a plurality of agent circuits; and
a cache configured to:
receive data requests from the plurality of agent circuits, wherein the data requests include a first request and a second request;
detect that the first and second requests specify addresses that correspond to different portions of the same cache line;
determine whether to delay processing one of the first and second requests based on whether the first and second requests are from a particular agent circuit of the plurality of agent circuits; and
service the first and second requests in parallel in response to determining that the first and second requests are from the particular agent circuit, wherein servicing the first and second requests in parallel includes a single retrieval of the cache line.

2. The integrated circuit of claim 1, wherein the cache is configured to:
delay servicing one of the first and second requests in response to determining that the first and second requests are from different ones of the plurality of agent circuits.

3. The integrated circuit of claim 1, wherein:
the cache is configured to determine whether the first and second requests hit in the cache; and
the cache is configured to service the first and second requests in parallel in response to the first and second requests hitting in the cache.

4. The integrated circuit of claim 3, wherein the cache is configured to lock the cache line while processing the first and second requests to prevent the cache line from being evicted from the cache.

5. The integrated circuit of claim 1, wherein the plurality of agent circuits includes a plurality of processor cores, wherein the cache is configured to service data requests from lower-level caches in the plurality of processor cores, and wherein the cache has a cache line size that is greater than a cache line size of a lower-level cache included in one of the plurality of processor cores.

6. The integrated circuit of claim 1, wherein the cache includes:
a data array configured to store data requested by the received data requests; and
a buffer configured to store the first and second requests until the data array services the first and second requests, wherein the buffer is further configured to store a respective indication with a particular received request that specifies an agent circuit that submitted the particular request, and wherein the cache is configured to determine whether the first and second requests are from the particular agent circuit by accessing stored indications for the first and second requests.

7. The integrated circuit of claim 6, wherein the cache is configured to:
detect that a third one of the received data requests has a first dependency on the first request;
store, in the buffer, first dependency information that specifies the first dependency; and
delay servicing the third request in response to the first dependency information.

8. The integrated circuit of claim 7, wherein the cache is configured to:
detect that the third request has a second dependency on the second request;
store, in the buffer, second dependency information that specifies the second dependency;
store, in the buffer, a count value with the third request, wherein the count value identifies a number of dependencies of the third request; and
delay servicing the third request until the count value indicates that the third request has no unresolved dependencies.

9. The integrated circuit of claim 8, wherein the cache is configured to:
detect that the data array has serviced the first request; and
decrement the count value in response to detecting that the first request has been serviced.

10. An integrated circuit, comprising:
a plurality of processor cores; and
a cache configured to:
receive a first request and a subsequent, second request that specify addresses corresponding to differing sections of the same cache line; and
determine whether the first and second requests are from the same one of the plurality of processor cores; and
in response to determining that the first and second requests are from the same processor core, processing the first and second requests in parallel, including retrieving the cache line, wherein processing the first and second requests in parallel includes a single retrieval of the cache line.

11. The integrated circuit of claim 10, wherein the cache is configured to:
store, in a request queue, the first request with a first indication identifying one of the plurality of processor cores as submitting the first request;
store, in the request queue, the second request with a second indication identifying one of the plurality of processor cores as submitting the seconded request; and
compare the first and second indications to determine whether the first and second requests are from the same processor core.

12. The integrated circuit of claim 11, wherein the cache is configured to:
- determine that a third request specifies an address that is specified by the first request;
- store, in the request queue, an indication that servicing the third request is dependent on the first request; and
- in response to the indication, process the first request before processing the third request.

13. The integrated circuit of claim 12, wherein the cache is configured to:
- determine that the third request is also dependent on the second request;
- adjust a count value for the first and second requests, wherein the count value is indicative of a number of pending requests on which the third request depends; and
- process the third request after the count value indicates that the third request is not dependent on any pending requests.

14. A method, comprising:
- receiving data requests from a plurality of processor cores;
- storing the data requests in a buffer configured to store pending data requests for a cache;
- determining that the buffer includes a first data request and a second data request that specify addresses associated with different portions of a particular cache line in the cache; and
- permitting the cache to service the first and second data requests in parallel in response to determining that the first and second data requests are from the same one of the plurality of processor cores, wherein servicing the first and second data requests includes a single retrieval of the cache line.

15. The method of claim 14, further comprising:
- determining that the buffer includes a third data request and a fourth data request that specify addresses associated with different portions of a particular cache line in the cache; and
- preventing the cache from servicing one of the third and fourth data requests in response to determining that the third and fourth data requests are from different ones of the plurality of processor cores.

16. The method of claim 15, further comprising:
- storing, in the buffer, indications identifying the different processor cores that issued the third and fourth data requests; and
- determining that the third and fourth data requests are from the different processor cores based on the stored indications.

17. The method of claim 14, further comprising:
- determining that the buffer includes a third data request that specifies an addressed specified by the first data request; and
- storing, in the buffer, a count value that identifies the third data request as being dependent on at least one other data request.

18. The method of claim 14, further comprising:
- the cache servicing the first and second data requests in a different order than an order in which the first and second data requests are received from the processor core.

* * * * *